US007840011B2

(12) United States Patent
Shimizu (10) Patent No.: US 7,840,011 B2
(45) Date of Patent: Nov. 23, 2010

(54) METHOD AND APPARATUS FOR DISTRIBUTED MANAGEMENT OF FILES

(75) Inventor: Junya Shimizu, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 1018 days.

(21) Appl. No.: 11/593,754

(22) Filed: Nov. 7, 2006

(65) Prior Publication Data

US 2007/0118737 A1 May 24, 2007

(30) Foreign Application Priority Data

Nov. 7, 2005 (JP) ............................. 2005-322899

(51) Int. Cl.
*H04L 9/00* (2006.01)
(52) U.S. Cl. ...................... 380/284; 709/219; 713/189
(58) Field of Classification Search ................ 380/284; 713/180, 184, 202, 189; 709/219
See application file for complete search history.

(56) References Cited

U.S. PATENT DOCUMENTS

| 5,596,640 | A  | * | 1/1997  | Ohta      | 380/243 |
| 6,571,336 | B1 | * | 5/2003  | Smith, Jr.| 713/184 |
| 6,601,233 | B1 | * | 7/2003  | Underwood | 717/102 |
| 6,850,911 | B1 | * | 2/2005  | Huether   | 705/51  |
| 7,047,410 | B1 | * | 5/2006  | Shin      | 713/180 |
| 7,272,380 | B2 | * | 9/2007  | Lee et al.| 455/410 |
| 2002/0078172 | A1 | * | 6/2002 | Yoshikai et al. | 709/218 |
| 2004/0093527 | A1 | * | 5/2004 | Pering et al. | 713/202 |
| 2004/0258241 | A1 | * | 12/2004 | Chang et al. | 380/200 |
| 2006/0031674 | A1 | * | 2/2006 | Sakurai | 713/166 |

FOREIGN PATENT DOCUMENTS

| JP | 2002135564 | 5/2002 |
| JP | 2002160479 | 6/2002 |
| JP | 2004118239 | 4/2004 |

* cited by examiner

*Primary Examiner*—Kieu Oanh Bui
*Assistant Examiner*—Thong Truong
(74) *Attorney, Agent, or Firm*—Kenneth R. Corsello; Anne VAchon Dougher (57) ABSTRACT

Apparatus and methods for computer file management including components and steps for distributing to servers a plurality of mixed images that are generated for each of N, where $N \geq 3$, sets of distributed information generated by distributing secret information using a threshold secret sharing scheme, the plurality of mixed images being generated by mixing at different mixing ratios an image based on the distributed information with (Ka−1) images, where Ka satisfies $1 < Ka < N$; transmitting Kb passwords, where Kb satisfies $1 < Kb < N$, entered by a user, and obtaining from the plurality of servers at least Ka mixed images for each of Kb sets; first restoring the Kb sets of distributed information based on the Ka mixed images that are obtained; and second restoring the secret information using the Kb sets of distributed information that have been restored.

13 Claims, 12 Drawing Sheets

METHOD AND APPARATUS FOR DISTRIBUTED MANAGEMENT OF FILES

FIELD OF THE INVENTION

The present invention relates to a restoration apparatus and a restoration program product, an information system, a restoration method, a storage apparatus, a storage system and a storage method. Particularly, the present invention relates to a restoration apparatus, a restoration program product, an information system, a restoration method, a storage apparatus, a storage system and a storage method for restoring information that is distributed to and managed by a plurality of servers.

BACKGROUND OF THE INVENTION

As a method for safely managing secret information, a management method is known whereby secret information is distributed to users by employing a threshold secret sharing scheme, and whereby the secret information can be restored by collecting the information from not less than a predetermined number of users to whom the information was previously distributed, based on user IDs and passwords (see, for example, Japanese Patent Laid-Open Publication No. 2003-333028).

Further, as a method whereby a server and a user verify and certify each other, a certification method is known that employs independent component analysis (see, for example, Japanese Patent Laid-Open Publication No. 2005-31730).

SUMMARY OF THE INVENTION

Where secret information is distributed, since all data stored in servers is in a binary form, a third party might infer that the data is related to the secret information. Further, where the secret information is distributed, when to restore the secret information the server transmits k sets of secret information, as a single transmission, in response to an access and the entry of k passwords by a user, the passwords or the secret information could be illegally intercepted by a third party.

Furthermore, since only by transmitting a password and receiving a response can a user determine whether a server is an authorized server. Therefore, if a user unintentionally has an access to an unauthorized server, a third party could illegally obtain secret information during a period from the leakage of passwords to a confirmation as to whether or not the server is an authorized one. Further, according to the authentication method that employs independent component analysis, a user must store in advance data into which secret information has been mixed. Thus, a possibility exists that secret information may be lost by a user.

The objective of the present invention, therefore, is to provide a restoration apparatus, a restoration program product, an information system, a restoration method, a storage apparatus, a storage system and a storage method that can resolve the above problems. This objective of the present invention is achieved by a combination of characteristics described in independent claims of this invention, and dependent claims of the invention define specific useful examples for this invention.

According to a first aspect of the invention, a restoration apparatus includes:

a communication unit for communicating with a server group that, to store secret information, distributes to a plurality of servers a plurality of mixed images that are generated for each of N (N is a three or greater integer) sets of distributed information that have been generated by distributing secret information using a threshold secret sharing scheme, said plurality of mixed images being generated by mixing at different mixing ratios an image based on the distributed information with (Ka−1) images (Ka is an integer that satisfies 1<Ka<N);

an acquisition unit for transmitting to the plurality of servers via the communication unit Kb passwords (Kb is an integer that satisfies 1<Kb<N) entered by a user, and for obtaining from the plurality of servers at least Ka mixed images for each of Kb sets of the distributed information;

a first restoration unit for restoring the Kb sets of distributed information based on the Ka mixed images that are obtained for the distributed information; and a second restoration unit for restoring the secret information using the Kb sets of distributed information that have been restored. Further, a program product that causes a computer to function as the restoration apparatus, an information system that employs the restoration apparatus, and a restoration method that employs the restoration apparatus are provided.

According to a second aspect of the invention, a storage apparatus, which stores secret information by distributing the secret information to a plurality of servers, includes:

a distributed information generator for distributing secret information using a threshold secret sharing scheme to generate N sets of distributed information (N is a three or greater integer);

a mixed image generator for generating for each of the N sets of distributed information a plurality of mixed images by mixing, at a mixing ratio that differs for each mixed image, an image that is based on the distributed information with (Ka−1) images (Ka is an integer that satisfies 1<Ka<N); and a mixed image storage unit for distributing to and storing in the plurality of servers the mixed images generated for each of N sets of distributed information, so that Ka or more mixed images generated for the same distributed information are not stored in a single server. Furthermore, a program product that causes a computer to functions as the storage apparatus, a storage system that employs the storage apparatus, and a storage method that employs the storage apparatus are provided.

The overview of the present invention does not enumerate all the characteristics required for this invention; sub-combinations of these characteristics also constitute the present invention.

According to the invention, where secret information is distributed and managed, an inference from appearances that information is secret is precluded to the extent possible, and information segments by which secret information are distributed are transferred a plurality of times. Thus, according to the invention, secret information can be safely stored and safely restored.

DETAILED DESCRIPTION OF THE INVENTION

The present invention will be explained while referring to one preferred embodiment of the present invention. It should be noted that the embodiment imposes no limitations on the present invention as cited in claims, and that not all characteristic combinations explained in the embodiment are requisite means for implementing the solution provided by the invention.

Figure 1:
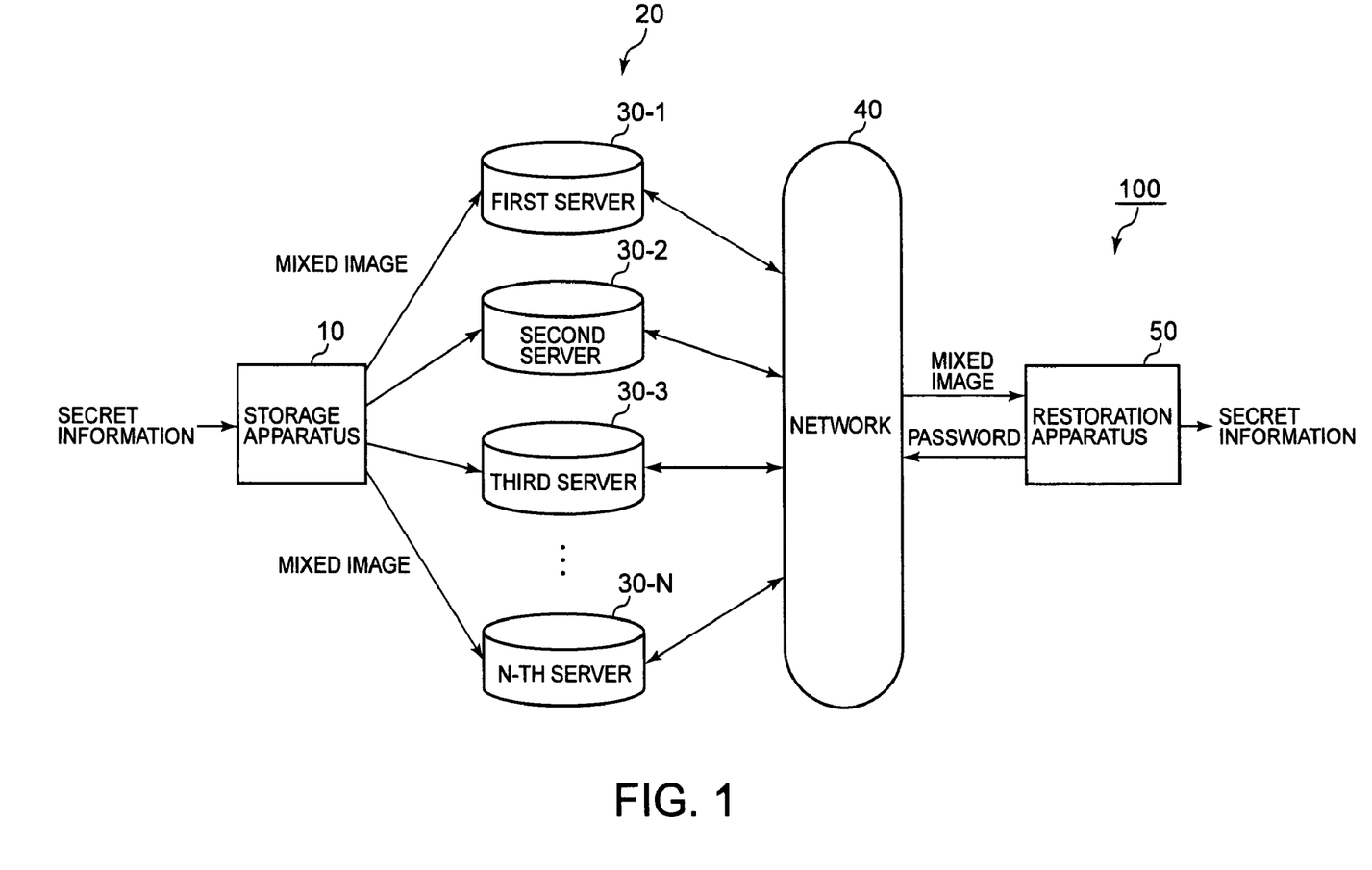
FIG. 1 is a diagram showing the configuration of an information system according to one embodiment of the present invention.

FIG. 1 is a diagram showing the configuration of an information system 100 according to the embodiment. The information system 100 includes a storage apparatus 10, a server group 20 having a plurality of servers 30, a network 40 and a restoration apparatus 50, and can safely store and safely restore secret information.

The storage apparatus 10 distributes secret information by employing a (Kb, N) threshold secret sharing scheme, and generates N sets of information for distribution. Further, at a mixture ratio differing for each of the N sets of distributed information, the storage apparatus 10 mixes one image, based on the distributed information, with (Ka−1) images, thereby generating a plurality of mixed images (e.g., N mixed images). Then, the storage apparatus 10 distributes, to the servers 30 (e.g., N servers 30), the mixed images (e.g., N mixed images) for each of N sets of distributed information, and the servers 30 store these mixed images. It should be noted that N is an integer equal to or greater than 3, and Ka and Kb are positive integers that satisfy 1<Ka<N and 1<Kb<N, respectively.

The server group 20 stores, in the plurality of servers 30, distributed mixed images each of which has been generated based on one set of distributed information. The server group 20 and the restoration apparatus 50 exchange information via the network 40. The restoration apparatus 50 obtains a plurality of mixed images from the server group 20 via the network 40 and restores secret information from the obtained mixed images. It should be noted that the same apparatus may be employed for both the storage apparatus 10 and the restoration apparatus 50. Further, in the following explanation the server group 20 includes, as an example, N servers 30, i.e., a first server 30-1 to an N-th server 30-N.

Figure 2:
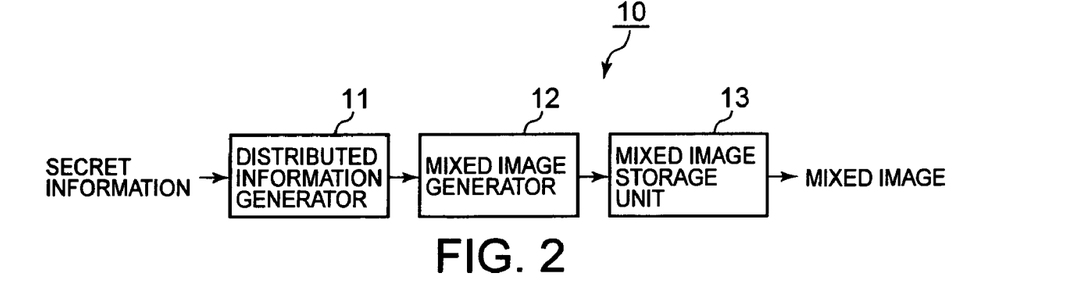
FIG. 2 is a diagram showing the configuration of a storage apparatus according to the embodiment.

FIG. 2 is a diagram showing the configuration of the storage apparatus 10 according to the embodiment. The storage apparatus 10 includes a distributed information generator 11, a mixed image generator 12 and a mixed image storage unit 13. The distributed information generator 11 distributes secret information by using a threshold secret sharing scheme, and generates N sets of distributed information. At a mixing ratio differing for each of a plurality of sets of distributed information, the mixed image generator 12 mixes an image based on distributed information, with (Ka−1) images, generating a plurality of mixed images. The mixed image storage unit 13 distributes to, and stores in, the plurality of servers 30 mixed images generated for each of the plurality of sets of distributed information, so that Ka or more mixed images, generated for the same distributed information, are not stored only in a single server 30.

Figure 3:
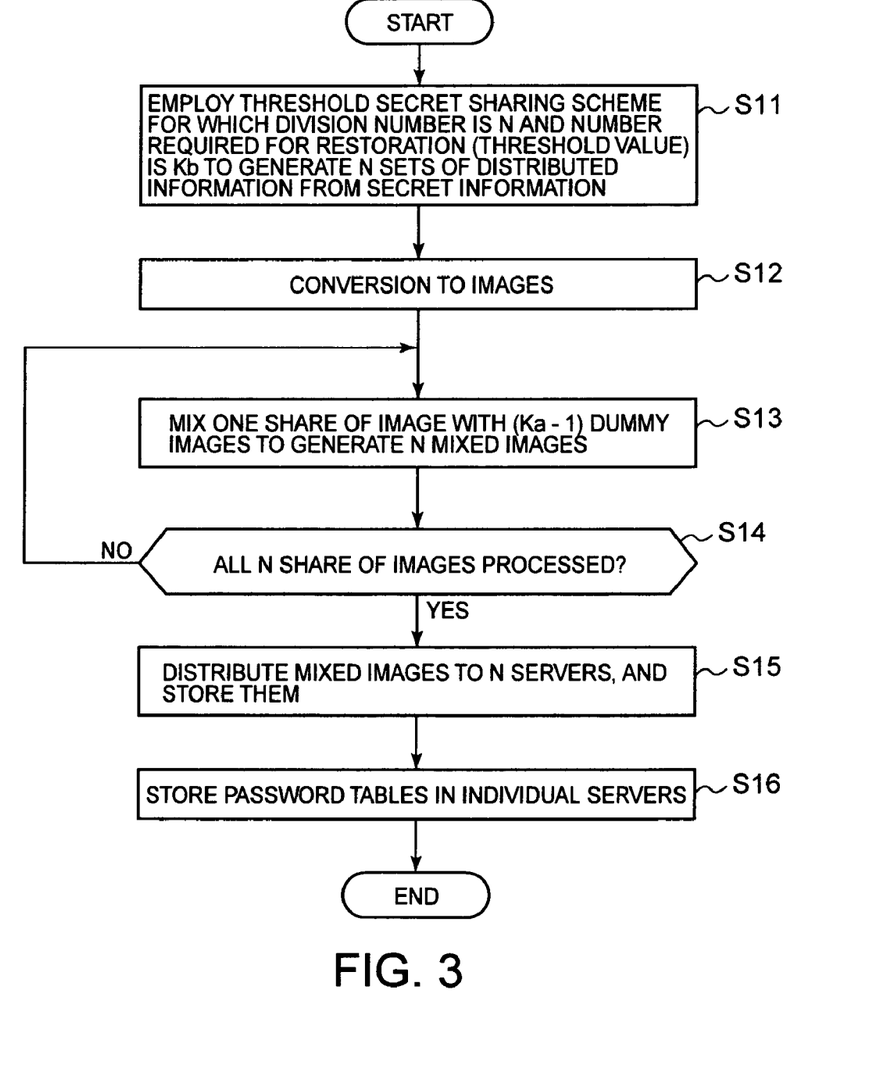
FIG. 3 is a flowchart showing the operation of the storage apparatus for the embodiment for generating and storing mixed images.

FIG. 3 is a flowchart showing the processing performed by the storage apparatus 10 of the embodiment for generating and storing mixed images.

First, the storage apparatus 10 divides secret information into N sets of distributed information by employing a threshold secret sharing scheme for which the division number is N and the number required for restoration (the threshold value) is Kb (S11). Then, the storage apparatus 10 converts the N sets of distributed information into N sets of image data (S12). As an example, the storage apparatus 10 divides distributed information, represented by binary data, into byte sized units, and regards the obtained bytes as pixel values in order to convert the distributed information into image data. The obtained image data are hereinafter referred to as a share of image.

The storage apparatus 10 sequentially selects a share of image from the N share of images, and mixes the selected share of image with (Ka−1) dummy images to generate a plurality of mixed images (S13). Specifically, based on one share of image, the storage apparatus 10 generates Ka or more mixed images. In the following explanation, as an example, one share of image is used by the storage apparatus 10 to generate N mixed images.

Sequentially, the storage apparatus 10 determines whether all of the N share of images have been processed (S14). When not all of the N share of images have been processed (No at S14), the storage apparatus 10 returns to step S13 and mixes the next share of image with dummy images. When all the share of images have been processed (Yes at S14), the storage apparatus 10 advances to step S15.

Following this, the storage apparatus 10 distributes to, and stores in, the N servers 30, the total (N×N) mixed images, i.e., N mixed images generated for each of N share of images, so that Ka or more mixed images generated for the same distributed information will not be stored in only a single server 30 (S15). Then, in association with each server 30, the storage apparatus 10 prepares a password table, wherein information is entered for designating a password and a mixed image to be transmitted, and stores this table in the corresponding server 30.

Figure 4:
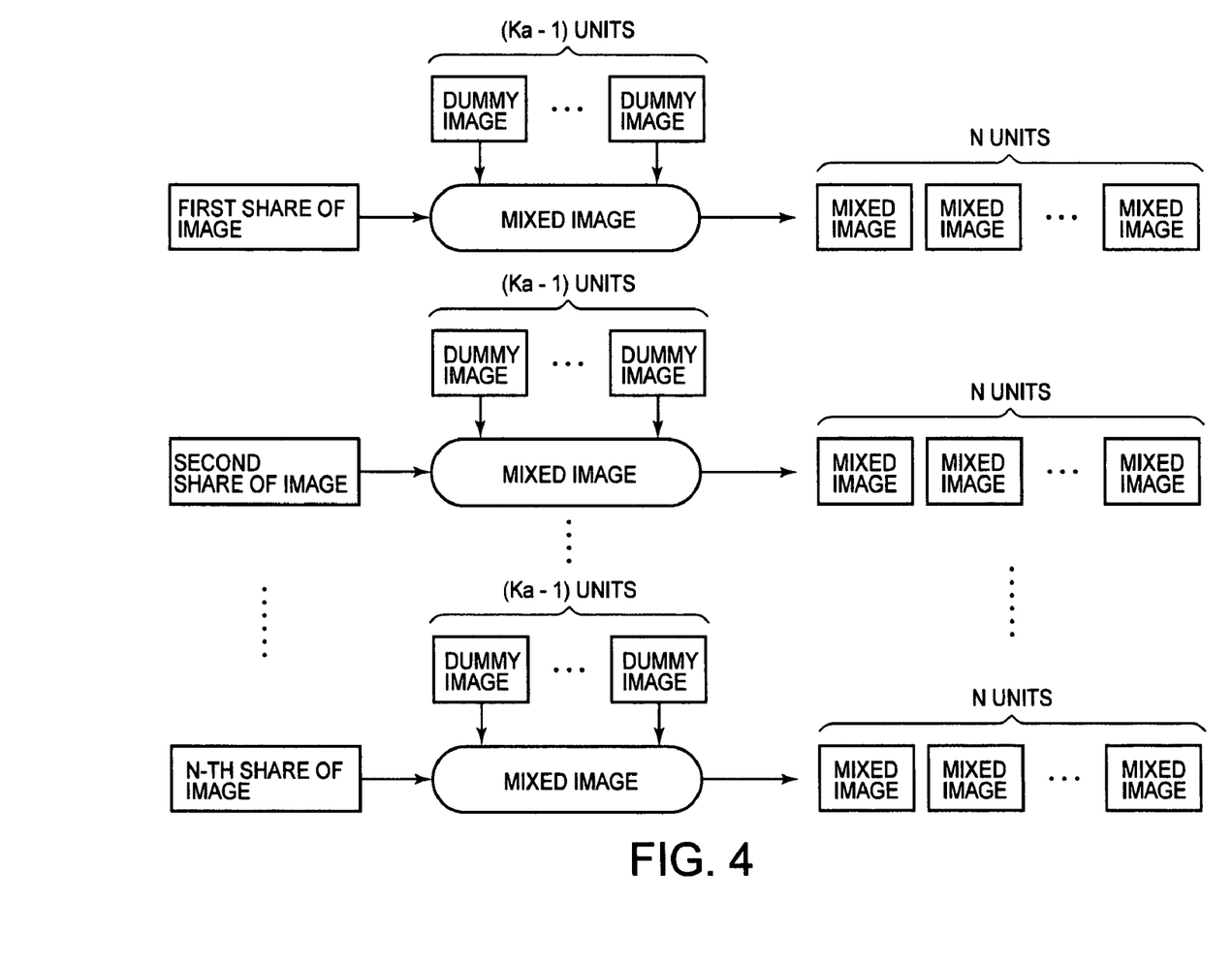
FIG. 4 is a diagram showing an example of process at step S13 in the flowchart in FIG. 3 for generating mixed images.

FIG. 4 is a diagram showing an example process at step S13 in the flowchart in FIG. 3 for generating mixed images. The storage apparatus 10 mixes each of N share of images with (Ka−1) dummy images at a mixture ratio differing for each of N share of images, and generates N mixed images (S13). Each of the (Ka−1) dummy images into which the one share of image is to be mixed is different from each other. The dummy images into which different share of images are to be mixed may also be different. Furthermore, the size of the dummy images is equal to or larger than that of the share of image. When the dummy images are larger than the share of image, the storage apparatus 10 may mix the share of image into predesignated locations in the dummy images.

Through this process, the share of image can be restored by performing an independent component analysis of an arbitrary number Ka of the N mixed images that have been generated in the above described manner. On the other hand, the share of image can not be restored from less than Ka mixed images by performing an independent component analysis. That is, the storage apparatus 10 mixes the share of image with (Ka−1) dummy images, so that the share of image can be extracted from Ka mixed images and restored by performing an independent component analysis. A method whereby, from ill-conditioned mixed images, an independent component analysis can be used to separate and restore original information is described in Japanese Patent Laid-Open Publication No. 2002-150265, submitted by the present inventor.

Assume that Ka=2, N=3 and s1, s2 and s3 are generated as pixel values for locations whereat share of image data are present. In this case, as an example, the storage apparatus 10 prepares a coefficient matrix of three rows and two columns for the pixel values of one dummy image and the pixel values of one share of image, and performs matrix operation to generate pixel values corresponding to three mixed images. Specifically, when d1 denotes the pixel value of a dummy image to be mixed with s1, d2 denotes the pixel value of a dummy image to be mixed with s2, and d3 denotes the pixel value of a dummy image to be mixed with s3, the following matrix equations (1), (2) and (3) can be respectively employed to generate pixel values (s1m1, s2m1, s3m1) for a mixed image that corresponds to the pixel value s1 of a share of image, pixel values (s1m2, s2m2, s3m2) for a mixed image that corresponds to the pixel value s2 of the share of image, and pixel values (s1m3, s2m3, s3m3) for a mixed image that corresponds to the pixel value s3 of the share of image.

[eq. 1]

$$\begin{pmatrix} s1m1 \\ s2m1 \\ s3m1 \end{pmatrix} = \begin{pmatrix} a_{11} & a_{12} \\ a_{21} & a_{22} \\ a_{31} & a_{23} \end{pmatrix} \begin{pmatrix} s_1 \\ d_1 \end{pmatrix} \quad (1)$$

$$\begin{pmatrix} s1m2 \\ s2m2 \\ s3m2 \end{pmatrix} = \begin{pmatrix} b_{11} & b_{12} \\ b_{21} & b_{22} \\ b_{31} & b_{23} \end{pmatrix} \begin{pmatrix} s_2 \\ d_2 \end{pmatrix} \quad (2)$$

$$\begin{pmatrix} s1m3 \\ s2m3 \\ s3m3 \end{pmatrix} = \begin{pmatrix} c_{11} & c_{12} \\ c_{21} & c_{22} \\ c_{31} & c_{23} \end{pmatrix} \begin{pmatrix} s_3 \\ d_3 \end{pmatrix} \quad (3)$$

According to the above described storage apparatus 10, N sets of distributed information, which are obtained by distributing secret information using the threshold secret sharing scheme, are converted into sets of image data. Then, the individual sets of image data are mixed with Ka−1 dummy images to generate a plurality of mixed images, which are then stored in the plurality of servers 30. In this manner, the storage apparatus 10 precludes the inference from appearance that secret information is being distributed, so that both safe storage and safe communication of secret information can be provided.

Further, when the storage apparatus 10 renders the coefficients by which a share of image is to be multiplied ($a_{11}$, $a_{21}$ and $a_{31}$, in the case of s1) much smaller than those by which a dummy image is to be multiplied ($a_{12}$, $a_{22}$ and $a_{32}$, in the case of d1), the presence in a mixed image of a share of image can be difficult to detect.

Figure 5:
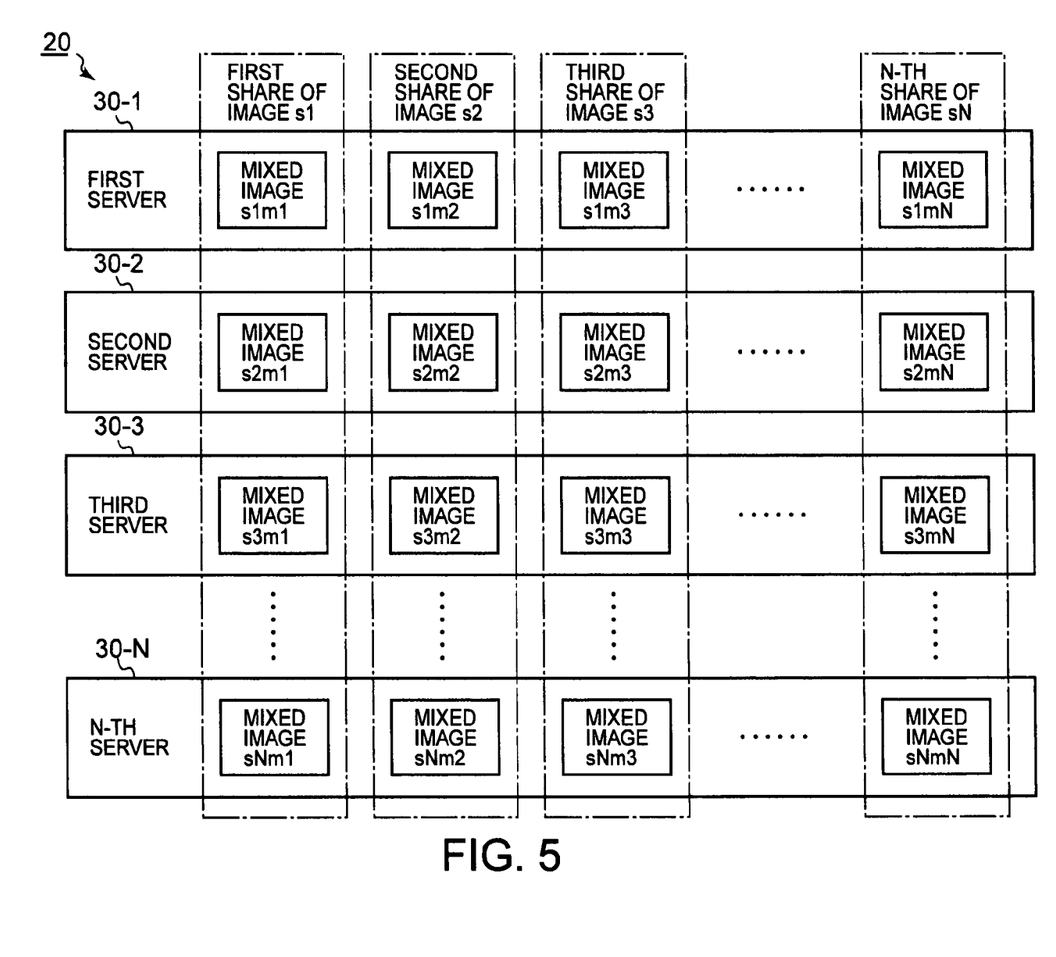
FIG. 5 is a diagram showing an example of mixed images that are distributed to and managed by individual servers.

FIG. 5 is a diagram showing an example of mixed images that are distributed to and managed by the server group 20. The storage apparatus 10 distributes to the server group 20 N mixed images that are generated based on one share of image, so that each mixed image can be stored in a different server 30. In the server group 20, for example, for the first share of image s1, the first mixed image s1m1 is stored in the first server 30-1, the second mixed image s2m1 is stored in the second server 30-2, and the N-th mixed image sNm1 is stored in the N-th server 30-N. Similarly to the first share of image s1, mixed images are distributed and stored in the servers 30 of the server group 20 for the second share of image s2 to the N-th share of image sN.

According to the above described server group 20, a plurality of mixed images that are generated based on one set of distributed information are not stored in a single server 30. Instead, each one of the servers 30 stores a portion of a plurality of mixed images. Since the server group 20 manages N mixed images in a distributed fashion, distributed information can not be restored by employing a mixed image stored in only one server 30. And therefore, secret information can be stored safely.

Figure 6:
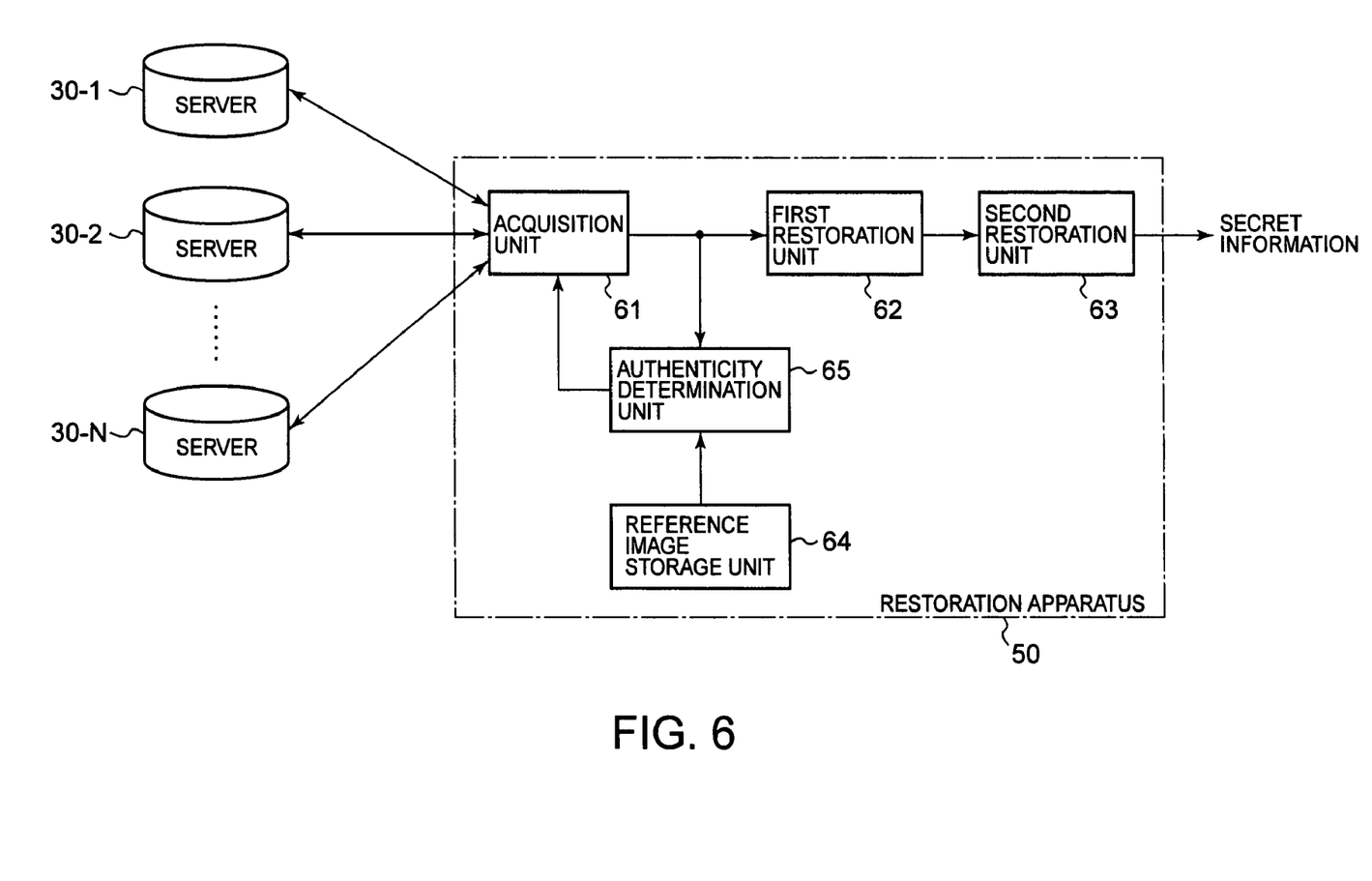
FIG. 6 is a diagram showing the configuration of a restoration apparatus according to the embodiment.

FIG. 6 is a diagram showing the configuration of the restoration apparatus 50 of the embodiment. The restoration apparatus 50 includes an acquisition unit 61, a first restoration unit 62, a second restoration unit 63, a reference image storage unit 64 and an authenticity determination unit 65.

The acquisition unit 61 transmits, to the plurality of servers 30, Kb passwords entered by a user, and receives from the servers 30 at least Ka mixed images for each of Kb sets of distributed information. The first restoration unit 62 restores each of Kb sets of distributed information based on at least Ka mixed images that are obtained for the set of distributed information. Specifically, by performing an independent component analysis, the first restoration unit 62 extracts, from at least Ka mixed images that are obtained for the same distributed information, an image that is based on this distributed information, and restores the pertinent distributed information. The second restoration unit 63 restores secret information from Kb sets of distributed information that have been restored by the first restoration unit 62.

The reference image storage unit 64 stores a reference image that is used to confirm the authenticity of a mixed image that the server 30 is to return in response to the reception of a password. When a difference between a reference image and a mixed image returned by a specific server in response to the submission of a specific password is equal to or greater than a predesignated reference value, the authentication unit 65 determines that the pertinent server 30 is an unauthorized server 30.

Figure 7:
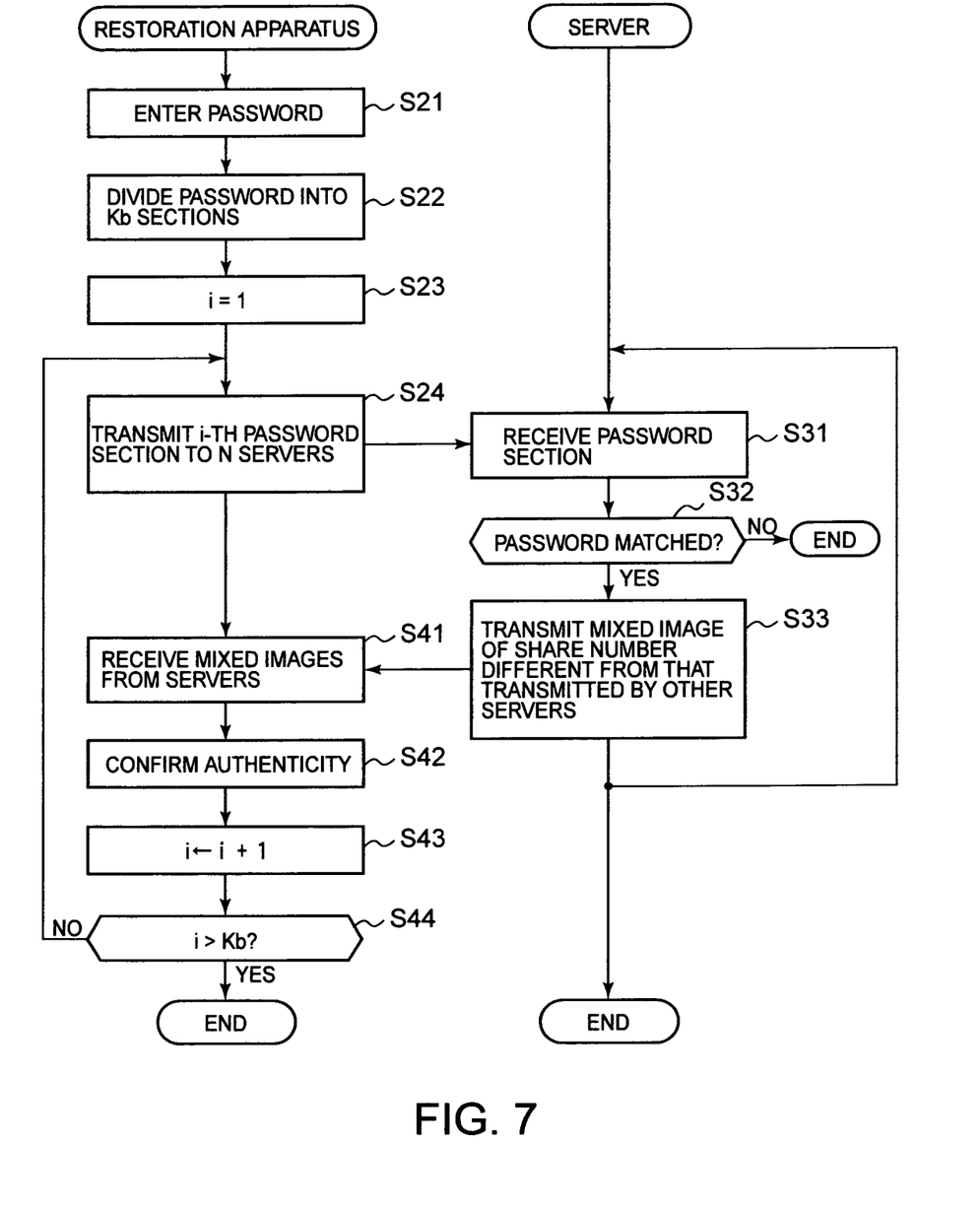
FIG. 7 is a flowchart showing the operation of the restoration apparatus for obtaining mixed images from a plurality of servers, and the operation of the servers for transmitting mixed images according to the embodiment.

FIG. 7 is a flowchart for the operation of the restoration apparatus 50 of the embodiment to obtain mixed images from a plurality of servers 30, and a flowchart for the operation of the servers 30 for transmitting mixed images.

First, the restoration apparatus 50 receives a password from a user (S21). Then, the acquisition unit 61 divides the received password and generates a total of Kb password sections, from the first section to the Kb-th section (S22). Alternately, Kb passwords may be received from the user. The acquisition unit 61 substitutes 1 for a variable i (S23), and thereafter, via the network 40, the acquisition unit 61 notifies a group of the first server 30-1 to the N-th server 30-N that the i-th password section and that the password portion is the i-th section (S24).

Following this, the servers 30 individually receive the i-th password section (S31), and determine whether the received password section matches an i-th password section that has been entered in the password table (S32). When the password sections do not match (No at S32), the servers 30 terminate the process. But when the password sections match (Yes at S32), the servers 30 advance to step S33.

Each of the servers 30 specifies one of a plurality of stored mixed images, that is to be returned in response to the i-th password section. Then, via the network 40, each server 30 transmits to the restoration apparatus 50 the specified mixed image and the share number for the share of image from which that mixed image was generated (S33). At this time, the individual servers 30 transmit mixed images, each of which has a different share number. That is, each server 30 does not transmit mixed image having the same share number as the image transmitted by the other server 30. Specifically, the storage apparatus 10 generates a password table, and each server 30 examines that password table to determine which mixed image to transmit.

Next, the restoration apparatus 50 receives a plurality of mixed images from the individual servers 30 (S41). The authenticity determination unit 65 analyzes the received mixed images and determines whether the servers that have returned the mixed images are authorized servers 30 (S42). Specifically, the authenticity determination unit 65 calculates differences between a reference image stored in the reference image storage unit 64 and the mixed images transmitted by each server 30, and determines whether the difference is equal to or greater than a reference value. For example, when image mixing is performed while a coefficient used for multiplication for a share of image is considerably smaller than a coefficient used for multiplication for a dummy image, the share of image component included in the mixed image is very small. In this case, the authenticity determination unit 65 calculates difference for the mixed images by employing, as a reference image, the synthesized component of the dummy image that does not include the share of image, and determines whether the mixed image is an authorized image.

When the authenticity determination unit 65 has determined at step S42 that a specific server 30 is an unauthorized server, the acquisition unit 61 does not transmit a password section to that specific server 30, and continues the transmission of the remaining password sections to all the servers 30 except the unauthorized one. Furthermore, the authenticity determination unit 65 may include an instruction unit for, when the authenticity determination unit 65 has determined at step S42 that a specific server 30 is unauthorized, instructing a user to change the password section that has already been transmitted to the unauthorized server 30. The restoration unit 50 may further include a registration unit for registering in all the servers 30 except the one determined to be unauthorized a changed password that has been entered by the user.

Following this, the restoration apparatus 50 updates the variable i to (i+1) (S43), and determines whether the variable i is greater than Kb (S44), i.e., whether mixed images have been obtained for all the Kb password sections. When the variable i is not greater than Kb (No at S44), program control returns to step S24 and the next password section is transmitted. When the variable i is greater than Kb (Yes at S44), the restoration apparatus 50 terminates the operation for obtaining mixed images. The restoration apparatus 50 thereafter restores secret information based on the mixed images obtained in this way.

As described above, according to the restoration apparatus 50 and the servers 30, when multiple servers 30 transmit multiple mixed images to the restoration apparatus 50, mixed images generated based on one set of distributed information are separately transmitted multiple times. In this way, restoration of secret information using only mixed images transmitted during a single transmission is prevented. Therefore, the restoration apparatus 50 and the servers 30 can exchange secret information safely. Further, when a password is changed for each communication between the restoration apparatus 50 and the servers 30, safe communication is established without having to change the password for each server 30. As a result, the management of passwords is simplified.

Figure 8:
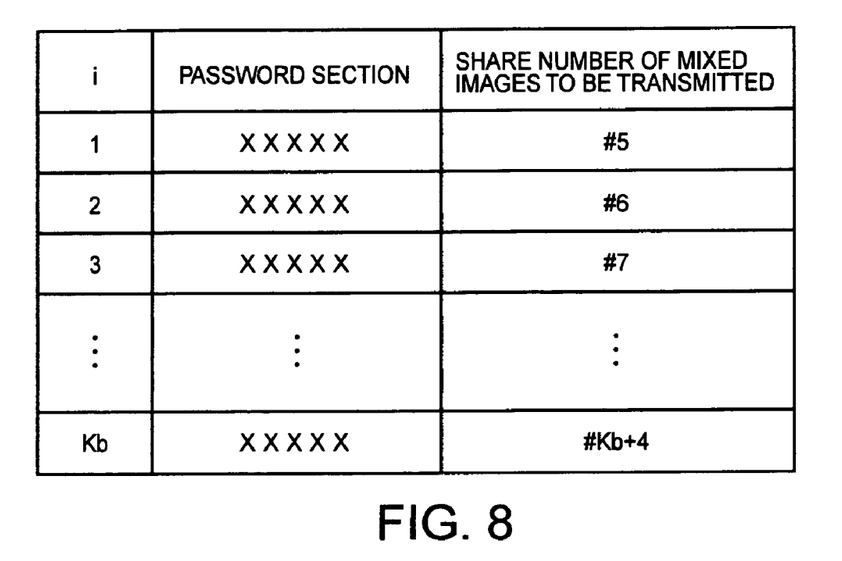
FIG. 8 is a diagram showing an example of password stored in each server.

FIG. 8 is a diagram showing an example of a password table stored in each server 30. In the password table, section numbers i from 1 to Kb, password sections correlated with the individual section numbers i and share numbers correlated with the section numbers i are entered. When each server 30 receives a password section, the server 30 refers to its password tables to verify the password and specifies a mixed image to be returned. It should be noted that instead of using the password tables, the servers 30 may employ programs or operation expressions to specify mixed images to be returned.

Figure 9:
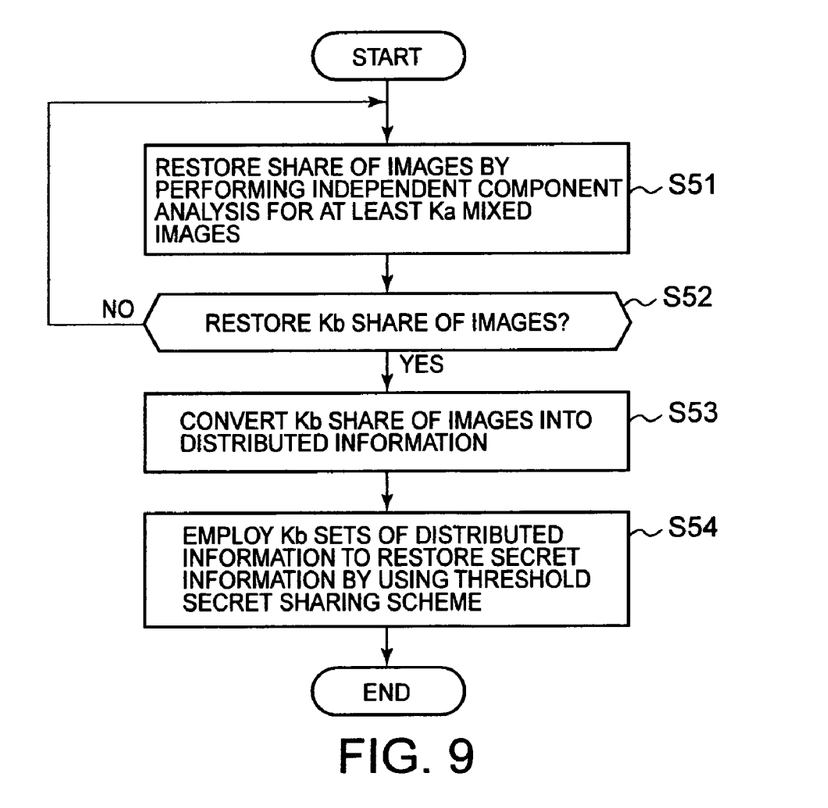
FIG. 9 is a flowchart of the operation of the restoration apparatus of the embodiment for restoring secret information from mixed images.

FIG. 9 is a flowchart showing the operation of the restoration apparatus 50 of this embodiment for restoring secret information based on mixed images.

First, after the restoration apparatus 50 has obtained mixed images through the process shown in FIG. 7, the restoration apparatus 50 extracts by employing independent component analysis from Ka mixed images having a same share number, a share of image, which is an independent component included in these mixed images, and restores the share of image (S51). Then, the restoration apparatus 50 determines whether at least Kb share of images have been restored (S52). When Kb share of images have not yet been restored (No at S52), the restoration apparatus 50 returns to step S51 and performs the restoration process for a different share number. When all the Kb share of images have been restored (Yes at S52), the restoration apparatus 50 advances to step S53.

Sequentially, the restoration apparatus 50 converts the Kb share of images into Kb sets of distributed information (S53). As an example, for this conversion to distributed information, the restoration apparatus 50 allocates the pixel values of the share of images to respective byte locations for binary data. Then, the restoration apparatus 50 employs the Kb sets of distributed information to restore the original secret information by using the threshold secret sharing scheme (S54).

FIGS. 10, 11, 12 and 13 are diagrams showing exemplary combinations of mixed images that are transmitted by the respective servers 30 to the restoration apparatus 50 in a case where N=4. In FIGS. 10 to 13, "sXmY" indicates a mixed image that is generated based on the Y-th share of image stored in the X-th server.

Figure 12:
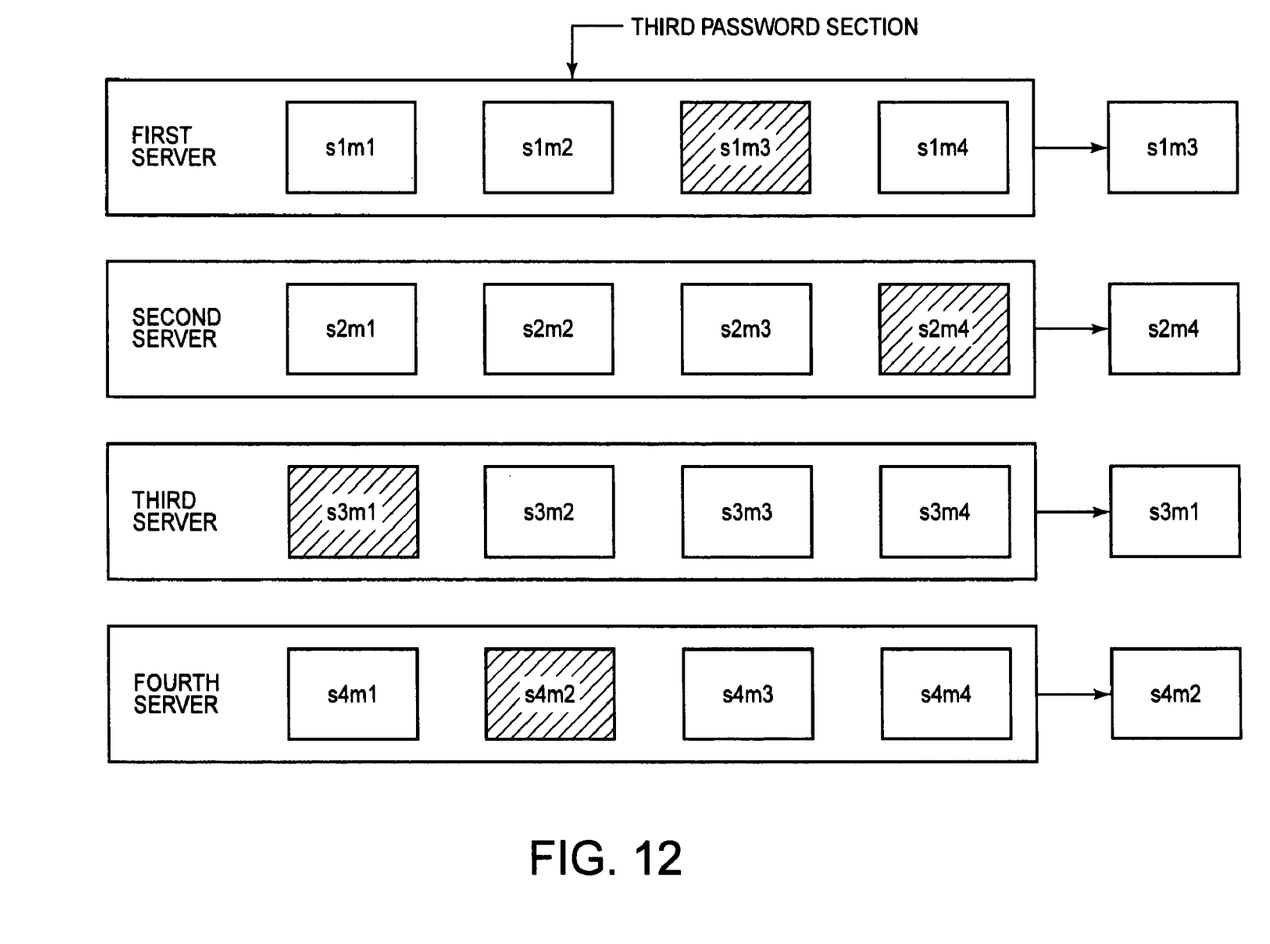
FIG. 12 is a diagram showing an example of mixed images transmitted by the servers to the restoration apparatus when the third password section is provided.
Figure 13:
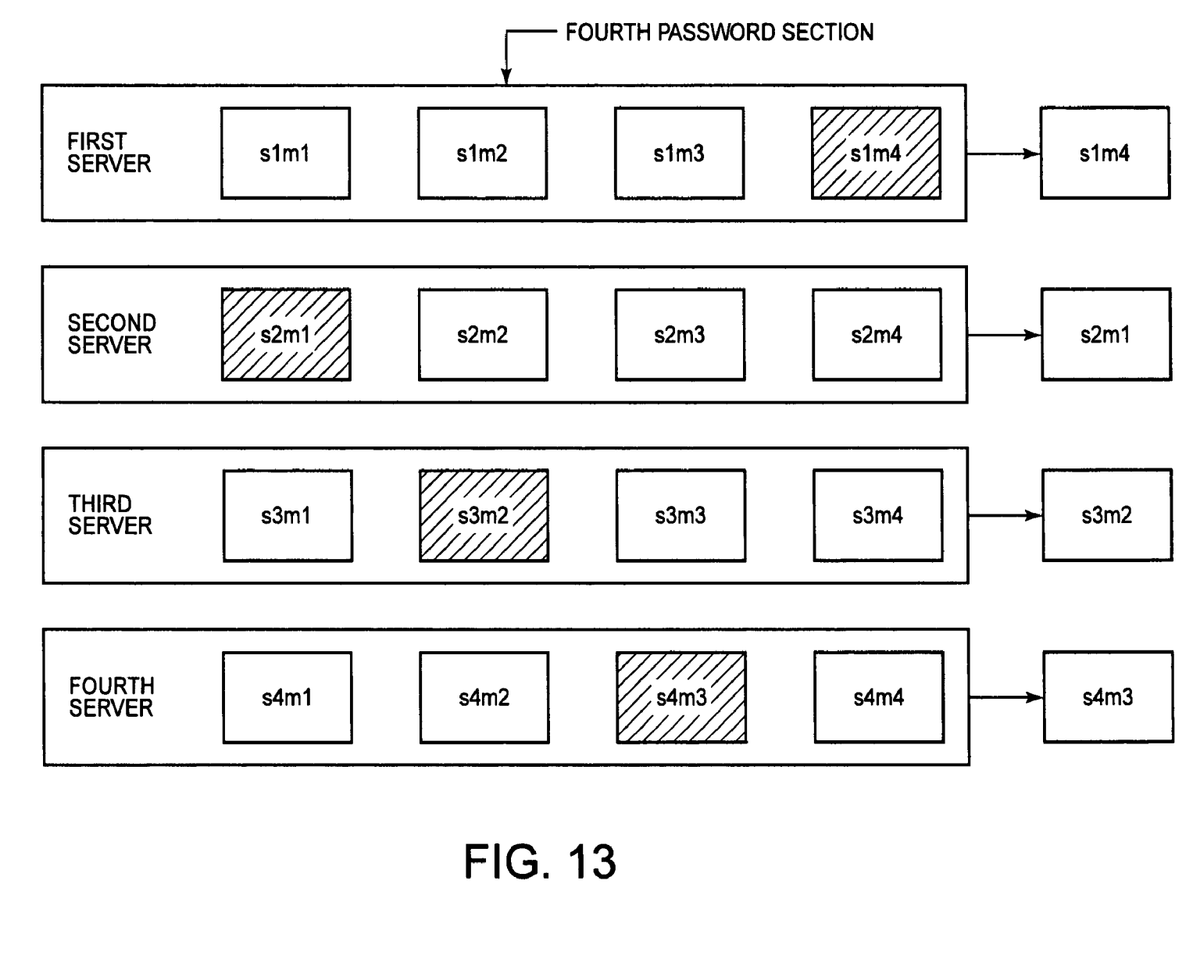
FIG. 13 is a diagram showing an example of mixed images transmitted by the servers to the restoration apparatus when the fourth password section is provided.

In the case where N=4, for example, the server group 20 transmits four combinations of mixed images, i.e., (s1$m$1, s2$m$2, s3$m$3, s4$m$4) (FIG. 10), (s1$m$2, s2$m$3, s3$m$4, s4$m$1) (FIG. 11), (s1$m$3, s2$m$4, s3$m$1, s4$m$2) (FIG. 12) and (s1$m$4, s2$m$1, s3$m$2, s4$m$3) (FIG. 13). Since the server group 20 transmits the mixed images in this manner, the overlapping of share numbers can be prevented.

Suppose that Ka and Kb are equal (e.g., Ka=Kb=3). When Ka=Kb=3, the server group 20 transmits mixed images three times. For example, the server group 20 transmits three combinations of mixed images shown in FIGS. 10, 11 and 12. In this case, by transmitting the first password section, the restoration apparatus 50 obtains (s1$m$1, s2$m$2, s3$m$3, s4$m$4); by transmitting the second password section, obtains (s1$m$2, s2$m$3, s3$m$4, s4$m$1); and by transmitting the third password section, obtains (s1$m$3, s2$m$4, s3$m$1, s4$m$2).

Figure 10:
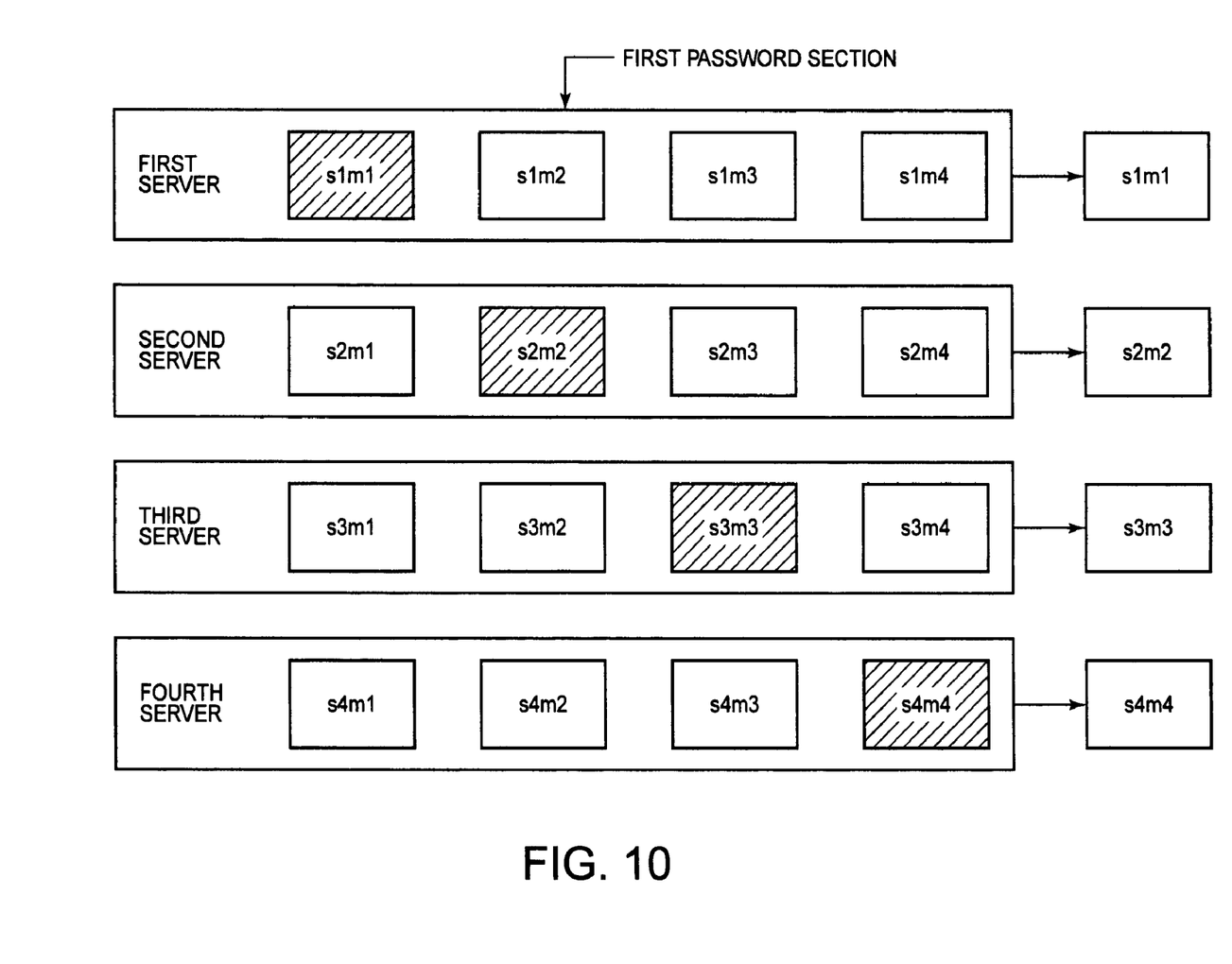
FIG. 10 is a diagram showing an example of mixed images transmitted by the servers to the restoration apparatus when the first password section is provided.
Figure 11:
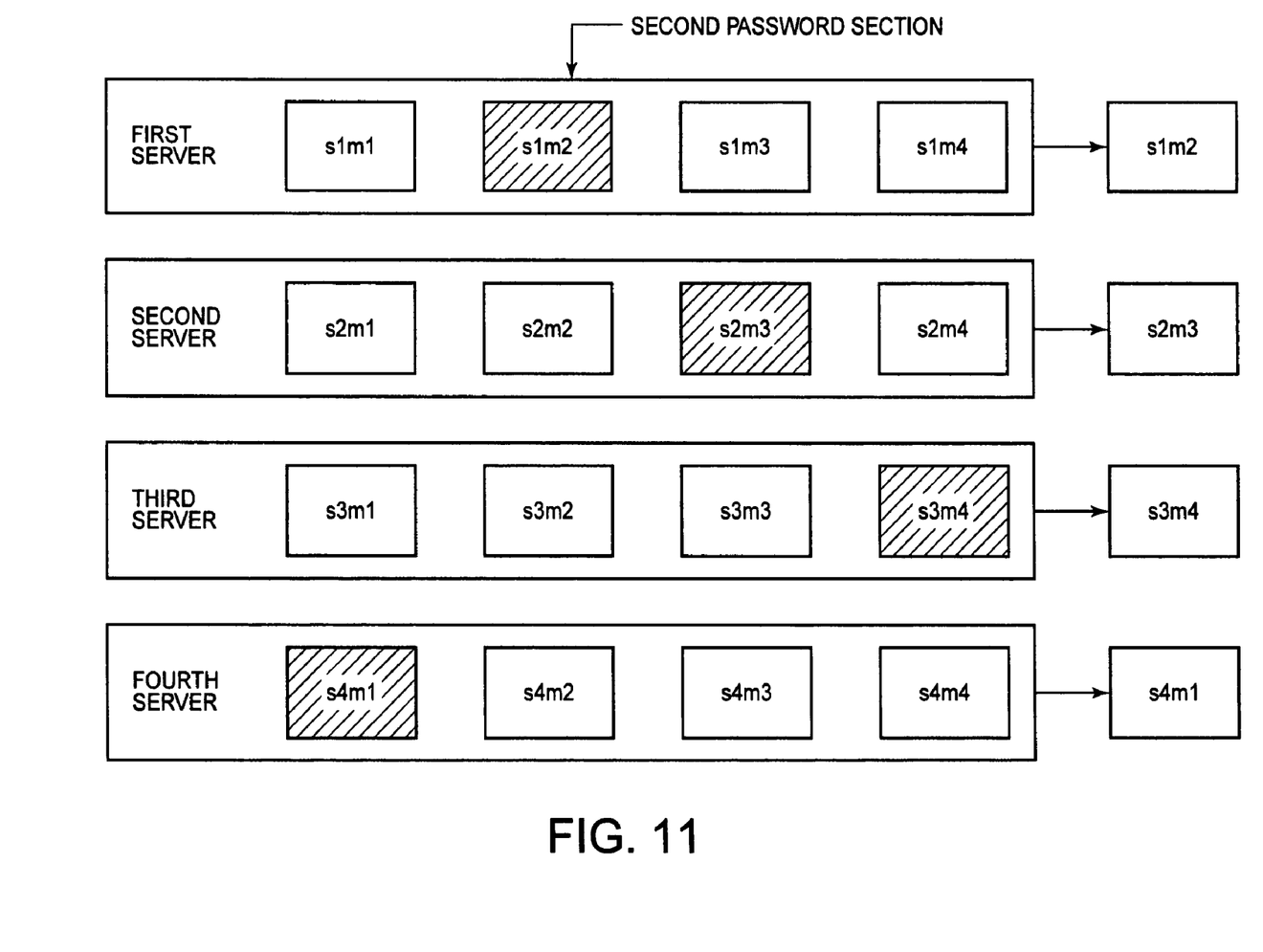
FIG. 11 is a diagram showing an example of mixed images transmitted by the servers to the restoration apparatus when the second password section is provided.

Then, based on the twelve obtained mixed images, the restoration apparatus 50 employs independent component analysis to extract share of images. Specifically, the restoration apparatus 50 restores the first share of image based on three mixed images (s1$m$1, s4$m$1, s3$m$1); restores the second share of image based on three mixed images (s2$m$2, s1$m$2, s4$m$2); restores the third share of image based on three mixed images (s3$m$3, s2$m$3, s1$m$3); and restores the fourth share of image based on three mixed images (s4$m$4, s3$m$4, s2$m$4). In this manner, the four share of images can be restored.

For four share of images, the restoration apparatus 50 converts at least Kb (three) share of images into respective sets of distributed information, and employs the three sets of distributed information to restore secret information using the threshold secret sharing scheme. Further, since secret information can be restored for at least three sets of distributed information, the restoration apparatus 50 need only obtain mixed images from at least three servers 30. As described above, Ka and Kb are equal, and upon receiving the same password, the servers 30 return a plurality of mixed images that are consonant with distributed information that is different for each other. As a result, the restoration apparatus 50 and the plurality of servers 30 can exchange information efficiently.

Figure 14:
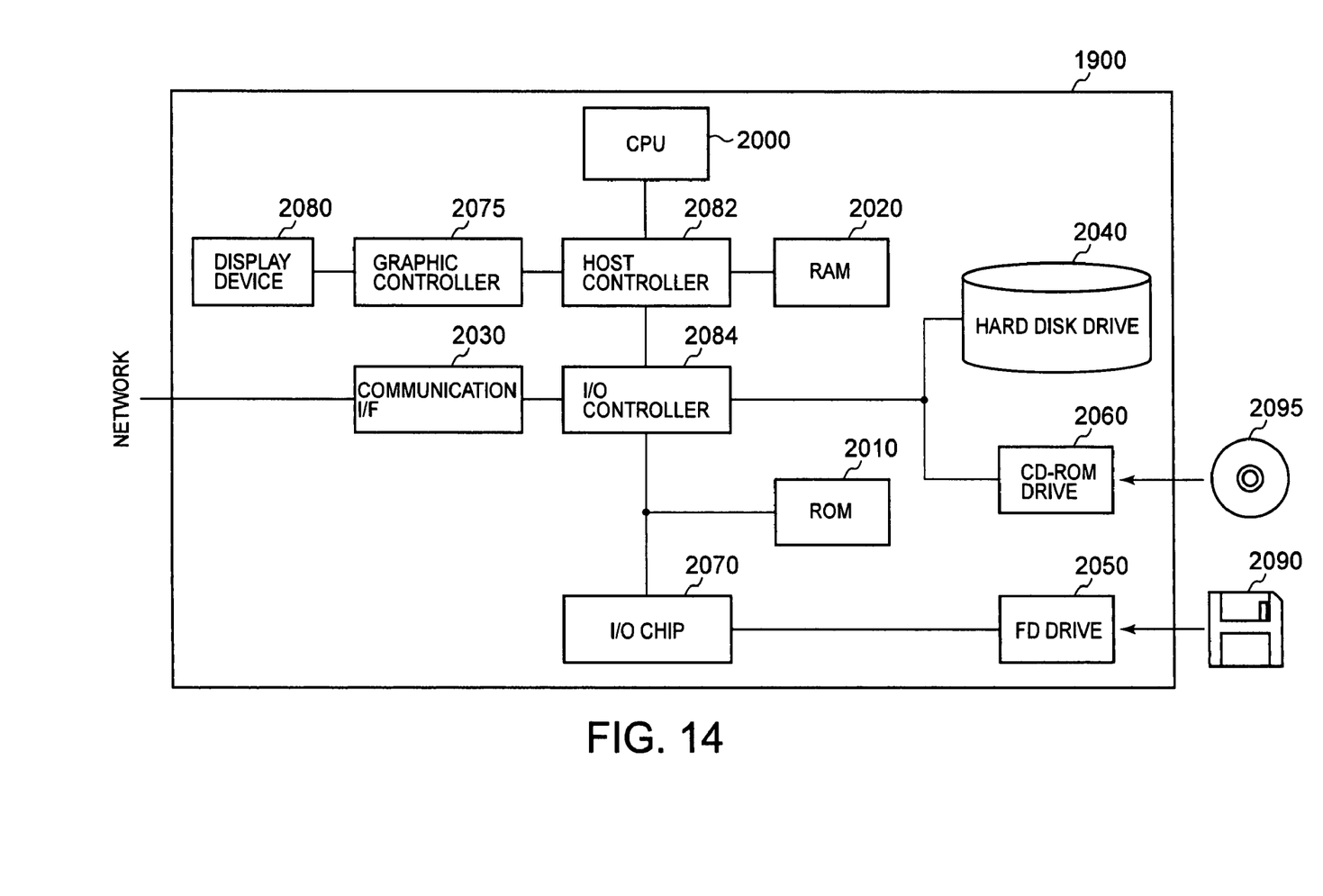
FIG. 14 is a diagram showing an example of hardware configuration of a computer according to the embodiment.

FIG. 14 is a diagram showing an example of hardware configuration for a computer 1900 according to the embodiment. The computer 1900 comprises: a CPU peripheral section, including a CPU 2000, a RAM 2020, a graphic controller 2075 and a display device 2080 that are interconnected by a host controller 2082; an input/output section, including a communication interface 2030, a hard disk drive 2040 and a CD-ROM drive 2060 that are connected to the host controller 2082 by an input/output controller 2084; and a legacy input/output section, including a ROM 2010, a flexible disk drive 2050 and an input/output chip 2070 that are connected to the input/output controller 2084.

The host controller 2082 connects the RAM 2020 to the CPU 2000 and the graphic controller 2075 which access the RAM 2020 at a high transfer rate. The CPU 2000 is operated based on programs stored in the ROM 2010 and the RAM 2020, and controls the individual portions of the computer 1900. The graphic controller 2075 obtains image data that the CPU 2000 generates in a frame buffer in the RAM 2020 and displays as image data on the display device 2080. Instead of this, the graphic controller 2075 may internally include a frame buffer for storing image data generated, for example, by the CPU 2000.

The input/output controller 2084 connects the host controller 2082 to the communication interface 2030 the hard disk drive 2040 and the CD-ROM drive 2060 which are comparatively fast input/output devices. The communication interface 2030 communicates with another device via a network. The hard disk drive 2040 stores programs and data used by the CPU 2000 of the computer 1900. The CD-ROM drive 2060 reads programs or data from a CD-ROM 2095 and provides the programs or data for the hard disk drive 2040 via the RAM 2020.

Further, the ROM 2010 and comparatively slow input/output devices, such as the flexible disk drive 2050 and the input/output chip 2070, are connected to the input/output controller 2084. The ROM 2010 includes, for example, a boot program that is executed when the computer 1900 is activated and programs that depend on the hardware of the computer 1900. The flexible disk drive 2050 reads a program or data from a flexible disk 2090, and provides the program or the data for the hard disk drive 2040 via the RAM 2020. The input/output chip 2070 connects the flexible disk drive 2050, or various types of input/output devices, via a parallel port, a serial port, a keyboard port and a mouse port, for example.

A program provided for the hard disk drive 2040, via the RAM 2020, is recorded on a flexible disk 2090, on the CD-ROM 2095 or on another recording medium, such as an IC card, and is to be employed by a user. The program is read from a recording medium, is installed on the hard disk drive 2040 of the computer 1900 via the RAM 2020, and is executed by the CPU 2000.

The program, which is installed in the computer 1900 and which causes the computer 1900 to function as the storage apparatus 10, includes: a distributed information generation module that serves as the distributed information generator 11; a mixed image generation module that serves as the mixed image generator 12; and a mixed image storage module that serves as a mixed image storage unit 13. This program and the modules operate the CPU 2000 and so on so that the computer 1900 can function as the distributed information generator 11, the mixed image generator 12 and the mixed image storage unit 13.

The program, which is installed in the computer 1900 and which causes the computer 1900 to function as the restoration apparatus 50, includes: an acquisition module that serves as the acquisition unit 61; the first restoration module that serves as the first restoration unit 62; the second restoration module that serves as the second restoration unit 63; a reference image storage module that serves as the reference image storage unit 64 for managing the hard disk drive 2040; and an authenticity determination module that serves as the authenticity determination unit 65. This program and the modules operate the CPU 2000, so that the computer 1900 can function as the acquisition unit 61, the first restoration unit 62, the second restoration unit 63, the reference image storage unit 64 and the authenticity determination unit 65.

The above described programs and modules may be stored on an external storage medium. This storage medium may not only be a flexible disk 2090 or a CD-ROM 2095, but can also be an optical recording medium, such as a DVD or a CD, a magneto-optical recording medium, such as an MO, a tape medium, or a semiconductor memory, such as an IC card. Furthermore, a storage device, such as a hard disk or a RAM, provided for a server system connected to a special communication network or the Internet may be employed as a recording medium. And a program may be provided for the computer 1900 via the network.

The present invention has been described by employing the embodiment. However, the technical scope of the present invention is not limited to this embodiment, and it will be obvious to one having ordinary skill in the art that the embodiment can be variously modified or improved. As is apparent from the claims of the invention, such modifications or improvements can also be included within the technical scope of the invention.

The invention claimed is:

1. A restoration apparatus comprising:
 a communication unit for communicating with a server group that, to store secret information, distributes to a plurality of servers a plurality of mixed images that are generated for each of N sets of distributed information that have been generated by distributing secret information using a threshold secret sharing scheme, wherein N is an integer of at least three, said plurality of mixed images being generated by converting the N sets of distributed information into N sets of image data and by mixing at different mixing ratios an image based on the distributed information with (Ka−1) dummy images, where Ka is an integer that satisfies 1<Ka<N;

an acquisition unit for transmitting to the plurality of servers via the communication unit Kb passwords, where Kb is an integer that satisfies 1<Kb<N, entered by a user, and for obtaining from the plurality of servers at least Ka mixed images for each of Kb sets of the distributed information;

a first restoration unit for restoring the Kb sets of distributed information based on the Ka mixed images that are obtained for the distributed information; and a second restoration unit for restoring the secret information using the Kb sets of distributed information that have been restored.

2. A restoration apparatus according to claim 1, wherein said first restoration unit extracts from the at least Ka mixed images that are obtained for the same distributed information an image that is based on the distributed information by employing independent component analysis so as to restore the distributed information.

3. A restoration apparatus according to claim 1, further comprising:

a reference image storage unit for storing a reference image used to confirm authenticity of the mixed images that the servers return upon receiving the passwords; and an authenticity determination unit for determining that one of said servers is unauthorized on condition that a difference between the reference image and the mixed image that are returned by the one of said servers in response to one of said passwords be equal to or greater than a predesignated reference value.

4. A restoration apparatus according to claim 3, wherein said acquisition unit transmits remaining passwords to the servers, except for said server that said authenticity determination unit has determined to be unauthorized.

5. A restoration apparatus according to claim 3, further comprising:

an instruction unit for instructing a user to change the password that has been transmitted to said server that is determined to be unauthorized; and a registration unit for registering with the servers except for said server determined to be unauthorized a password that has been changed and entered by the user.

6. A non-transitory computer usable recording medium storing a program for causing a computer to function as a restoration apparatus for restoring secret information, and for causing the computer to serve as:

a communication unit for communicating with a server group that, to store secret information, distributes to a plurality of servers a plurality of mixed images that are generated for each of N sets of distributed information that have been generated by distributing secret information using a threshold secret sharing scheme, where N is an integer of three or more, said plurality of mixed images being generated by converting the N sets of distributed information into N sets of image data and by mixing at different mixing ratios an image based on the distributed information with (Ka−1) dummy images, Ka is an integer that satisfies 1<Ka<N;

an acquisition unit for transmitting to the plurality of servers via said communication unit Kb passwords, Kb is an integer that satisfies 1<Kb<N, entered by a user, and for obtaining from the plurality of servers at least Ka mixed images for each of Kb sets of the distributed information;

a first restoration unit for restoring the Kb sets of distributed information based on the Ka mixed images that are obtained for the distributed information; and a second restoration unit for restoring the secret information using the Kb sets of distributed information that have been restored.

7. An information system comprising:

a server group for, to store secret information, distributing to a plurality of servers a plurality of mixed images that are generated for each of N sets of distributed information that have been generated by distributing secret information using a threshold secret sharing scheme, where N is an integer of three or more, said plurality of mixed images being generated by converting the N sets of distributed information into N sets of image data and by mixing at different mixing ratios an image based on the distributed information with (Ka−1) dummy images, Ka is an integer that satisfies 1<Ka<N;

an acquisition unit for transmitting to the plurality of servers Kb passwords (Kb is an integer that satisfies 1<Kb<N) entered by a user, and for obtaining from the plurality of servers at least Ka mixed images for each of Kb sets of the distributed information;

a first restoration unit for restoring the Kb sets of distributed information based on the Ka mixed images that are obtained for the distributed information; and a second restoration unit for restoring the secret information using the Kb sets of distributed information that have been restored.

8. An information system according to claim 7, wherein Ka and Kb are equal, and wherein, upon receiving the same password, said plurality of servers return a plurality of said mixed images that are consonant with the distributed information and that differ server by server.

9. A restoration method comprising:

a transmission step of transmitting Kb passwords (Kb is an integer that satisfies 1<Kb<N) entered by a user to a plurality of servers that store in a distributed fashion a plurality of mixed images that are generated for each of N sets of distributed information that have been generated by distributing secret information using a threshold secret sharing scheme, where N is an integer of three or more, said plurality of mixed images being generated by converting the N sets of distributed information into N sets of image data, and by mixing at different mixing ratios an image based on the distributed information with (Ka−1) dummy images, Ka is an integer that satisfies 1<Ka<N;

an acquisition step of obtaining from the plurality of servers at least Ka mixed images for each of Kb sets of the distributed information corresponding to the Kb passwords;

a first restoration step of restoring the Kb sets of distributed information based on the Ka mixed images that are obtained for the distributed information; and a second restoration step of restoring the secret information using the Kb sets of distributed information that have been restored.

10. A storage apparatus for storing secret information by distributing the secret information to a plurality of servers, comprising:

a distributed information generator for distributing secret information using a threshold secret sharing scheme to generate N sets of distributed information, where N is an integer of three or more;

a mixed image generator for generating for each of the N sets of distributed information a plurality of mixed images by converting the N sets of distributed information into N sets of image data, and by mixing, at a mixing ratio that differs for each mixed image, an image that is based on the distributed information with (Ka−1) dummy images, Ka is an integer that satisfies 1<Ka<N; and a mixed image storage unit for distributing to and storing in the plurality of servers the mixed images generated for each of N sets of distributed information, such that Ka or more mixed images generated for the same distributed information are not stored in a single server.

11. A non-transitory computer usable recording medium storing a program for causing a computer to function as a storage apparatus for restoring secret information, and for causing the computer to serve as:

a distributed information generator for distributing secret information using a threshold secret sharing scheme to generate N sets of distributed information, where N is an integer of three or more;

a mixed image generator for generating for each of the N sets of distributed information a plurality of mixed images by converting the N sets of distributed information into N sets of image data and by mixing, at a mixing ratio that differs for each mixed image, an image that is based on the distributed information with (Ka−1) dummy images, where Ka is an integer that satisfies 1<Ka<N; and a mixed image storage unit for distributing to and storing in the plurality of servers the mixed images generated for each of N sets of distributed information, such that the N sets of distributed information are protected from unauthorized accesses to the servers.

12. A storage system for storing secret information comprising:

a plurality of servers;

a storage apparatus for distributing secret information to a plurality of servers to store the secret information; and a restoration apparatus for restoring the secret information distributed to and stored in the plurality of servers, the storage apparatus including a distributed information generator for distributing secret information using a threshold secret sharing scheme to generate N sets of distributed information, where N is an integer of three or more, a mixed image generator for generating for each of the N sets of distributed information a plurality of mixed images by converting the N sets of distributed information into N sets of image data and by mixing, at a mixing ratio that differs for each mixed image, an image that is based on the distributed information with (Ka−1) dummy images, where Ka is an integer that satisfies 1<Ka<N, and a mixed image storage unit for distributing to and storing in the plurality of servers the mixed images generated for each of N sets of distributed information, such that the N sets of distributed information are protected from unauthorized accesses to the servers, the restoration apparatus including a communication unit for communicating with the plurality of servers, an acquisition unit for transmitting to the plurality of servers via the communication unit Kb passwords, where Kb is an integer that satisfies 1<Kb<N, entered by a user and for obtaining from the plurality of servers at least Ka mixed images for each of Kb sets of the distributed information, a first restoration unit for restoring the Kb sets of distributed information based on the Ka mixed images that are obtained for the distributed information, and a second restoration unit for restoring the secret information using the Kb sets of distributed information that have been restored.

13. A storage method for distributing secret information to a plurality of servers to store the secret information, comprising:

a distributed information generation step of distributing secret information using a threshold secret sharing scheme to generate N sets of distributed information, where N is an integer of three or more;

a mixed image generation step of generating for each of the N sets of distributed information a plurality of mixed images by converting the N sets of distributed information into N sets of image data and by mixing, at a mixing ratio that differs for each mixed image, an image that is based on the distributed information with (Ka−1) dummy images, where Ka is an integer that satisfies 1<Ka<N; and a mixed image storage step of distributing to and storing in the plurality of servers the mixed images generated for each of N sets of distributed information, such that Ka or more mixed images generated for the same distributed information are not stored in a single server.

* * * * *